United States Patent Office 3,523,782
Patented Aug. 11, 1970

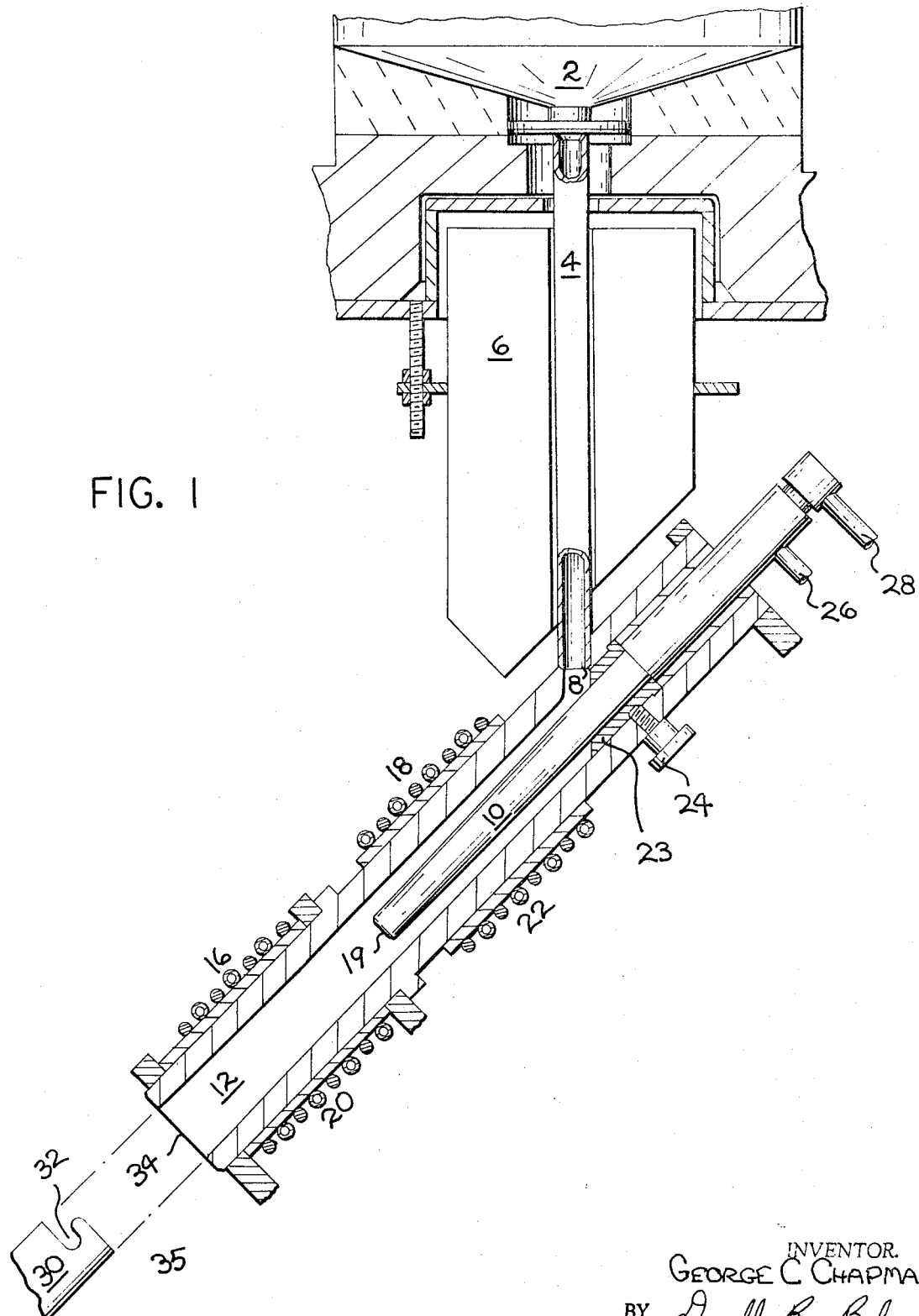

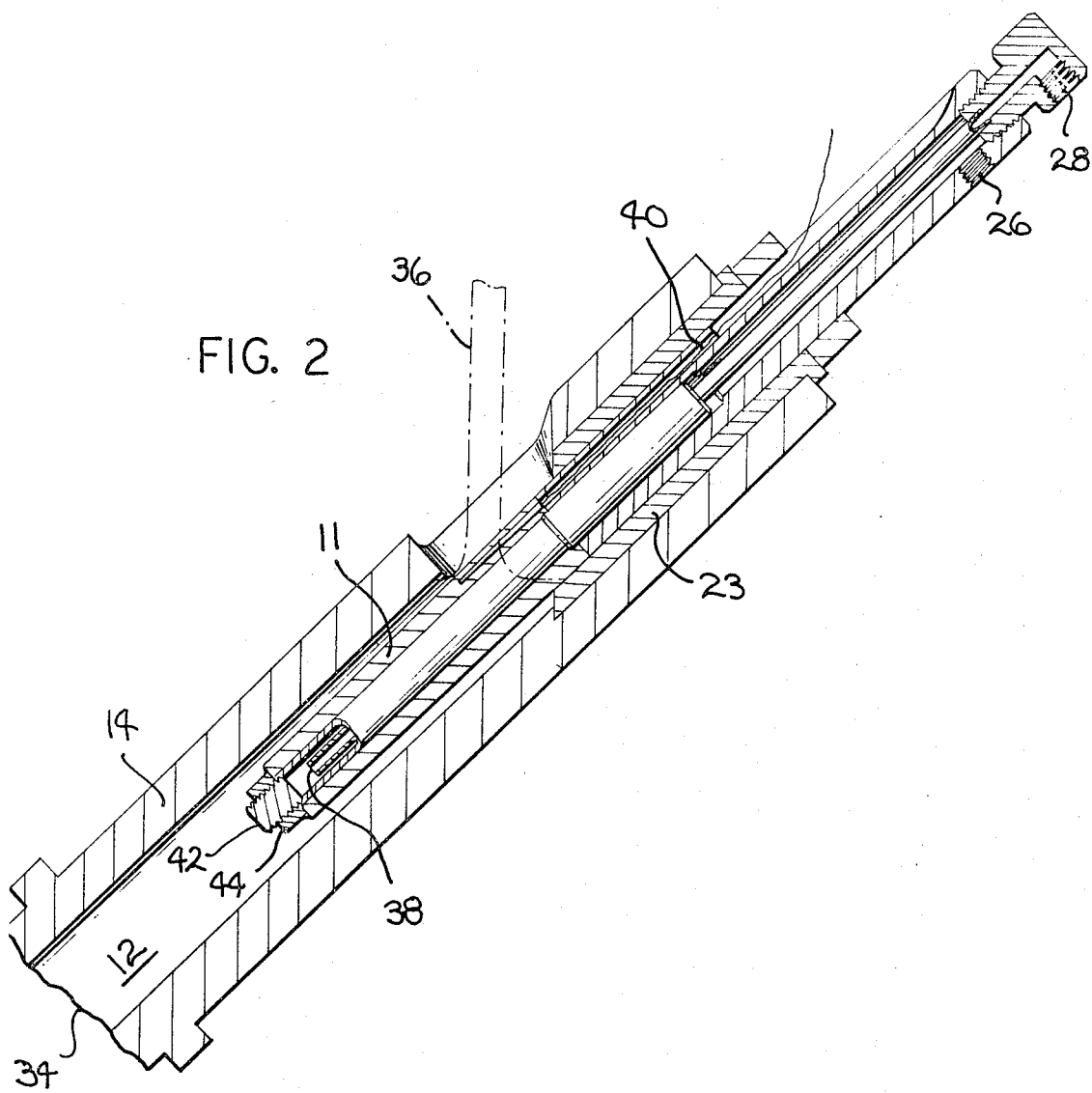

3,523,782
GLASS TUBE FORMING APPARATUS
George C. Chapman, Toledo, Ohio, assignor to Owens-Illinois, Inc., a corporation of Ohio
Filed Oct. 3, 1966, Ser. No. 583,831
Int. Cl. C03b 5/32
U.S. Cl. 65—184                                    4 Claims

ABSTRACT OF THE DISCLOSURE

Glass tubing is continuously cast into a shape which has structural rigidity by flowing molten glass into an annular molding space, the central axis of which is angularly oriented, which molding space is defined by an inner, internally cooled elongate mandrel and an outer, elongate annular mold which is disposed concentrically with respect to the mandrel and which extends beyond the end of the mandrel for a substantial distance. The molten glass may be flowed into the annular molding space either in an open stream or through a closed delivery tube. One or the other of the mandrel and the annular mold may be advantageously rotated.

---

This invention is concerned with a method and apparatus for continuously casting an elongated hollow article from glass or other thermoplastic materials. More specifically, this invention is concerned with a method and apparatus whereby high quality tubing can be readily formed from glasses which are not acceptable in conventional drawing processes.

Conventionally, glass rod or tubing is manufactured by drawing processes such as the Danner process. In this process a tubular refractory sleeve is mounted on a metallic blow-pipe and a molten stream of glass is poured onto the sleeve which serves to permit the molten glass to flow thereon due to the rotation of the mandrel as well as the action of gravity in combination with lengthwise drawing of the material therefrom in a substantially horizontal direction. In the making of tubing the mandrel discharge end has a perforated tip which is employed as a blow-pipe.

The above described conventional process for the formation of glass tubing cannot be utilized with various specialty glasses which have physical properties, for example, viscosity and liquidus temperatures which do not render themselves to drawing procedures. There is a tremendous demand for articles including tubing which are manufactured from specialty glasses, for example, laser rods, fiber optics, radiation shielding glasses, etc. In most cases, the physical properties of these glasses, notably their viscosity and liquidus temperature relationship, are such that conventional drawing procedures cannot be utilized. In the past, tubing was manufactured from these specialty glasses by casting short sections of tubing individually in a mold. In accordance with the apparatus and method of this invention, these glasses can be continuously cast to form articles such as tubing.

The primary object of this invention is a new, improved method and apparatus for continuous casting of hollow articles formed from thermoplastic materials.

A further object of this invention comprises apparatus and a method for continuously casting glass articles to form tubing having improved physical characteristics.

Still another object of this invention is to provide apparatus whereby specialty glass tubing can be continuously cast.

Finally, the objects of this invention include all the other novel features which will be obvious from the specification and claims at hand.

FIGS. 1 and 2 illustrate the apparatus and method of this invention.

FIG. 1 illustrates the apparatus of this invention wherein a closed delivery system is utilized.

FIG. 2 represents another embodiment of this invention wherein an open delivery system is utilized.

Referring to FIG. 1, the apparatus of this invention utilizes a conventional glass furnace 2. Molten glass is fed from glass furnace 2 through a closed delivery tube 4 into a mold orifice 8. Means 6 is provided whereby temperature of the delivery tube 4 can be carefully regulated so as to provide glass in orifice 8 which has the proper viscosity properties.

The molten glass from orifice 8 is fed into a composite mold assembly around mandrel 10 which generally forms the inner periphery of the resulting cast object. The outer walls of resulting cast object are formed by a cylindrical wall portion 14. Temperature regulating means 16, 18, 20, and 22 are provided around the outer periphery of wall portion 14. These temperature controlling means are thermostatically controlled in such a way that they permit temperature of the composite mold system to be carefully controlled.

As can be seen from the drawings, a composite mold system is angularly disposed. This facilitates the flow of the molten glass through said composite mold system. A stop gap plug 23, which is held in position by a screw 24, prevents the back-up of glass onto the upper extremities of mandrel 10.

A means for cooling mandrel 10 is provided, whereby a coolant is circulated through orifice 26 down through the mandrel and then out through orifice 28.

It is understood by one skilled in the art that the cooling means utilized in mandrel 10 can take many forms. For example, in contrast to the above described arrangement, a single spirally wound U-shaped coil tubing could be utilized wherein a coolant could be circulated in one side of the tube and then withdrawn from the other side.

With specific regard to the cooling system as illustrated in FIGS. 1 and 2, it is to be noted that the coolant in question circulates down a hollow member which is immediately adjacent to the mandrel and returns via centrally disposed tube member 38. This procedure allows the coolant to be in direct contact with the mandrel and hence allows maximum cooling efficiency.

The mandrel 10 as represented in FIG. 1 is formed from stainless steel. In an alternate embodiment, as is illustrated in FIG. 2, the composite mandrel can comprise central arbor 42 onto which is placed a mandrel shell 11 which is retained in position by a nut 44. This procedure allows mandrel portion 11 to be formed from a non-glass wetting composition such as graphite and allows a higher mandrel temperature which in turn forms a smoother inside surface of the formed article.

It is to be noted that, if desirable, both the centrally disposed mandrel 10 and the mold 14 can be rotated during the casting process. It is obvious to one skilled in the art that if mold area 14 is to be rotated, an appropriate coupling arrangement must be provided for the glass feed system.

FIG. 2 illustrates an alternate embodiment of this invention which utilizes a non-enclosed continuous stream of molten glass 36. FIG. 2 likewise illustrates a thermostat 40 which is used to regulate the mandrel temperature.

For purposes of this invention, the enclosed delivery system as is illustrated in FIG. 1 is preferred. This closed delivery system is preferred in that it allows the pressure head in delivery tube 4 to facilitate the flow of the glass into the mold and around the mandrel 10.

The glass article cools as it generally proceeds from intake orifice 8 to exit orifice 34. During this cooling, the glass article contracts. To prevent the binding of the inner periphery resulting article onto mandrel 10, said mandrel is generally tapered from the area of orifice 8 to tip 19. That is, mandrel 10 decreases in diameter as the distance from the orifice 8 to tip 19 increases. Mold 14 is at a higher temperature in the vicinity of orifice 8 and as such expands in this area. To provide proper relief for the resulting article, the inside diameter as formed by mold wall surface 14 increases as the distance from the orifice 8 to orifice 34 increases.

In operation, a hollow bait member 30 having a hook portion 32 is inserted into orifice 34 through mold area 12 and onto mandrel 10. Molten glass is then allowed to flow through orifice 8 down and around mandrel 10 and into hook portion 32 of bait 30. The initial molten glass is then allowed to solidify in hook portion 32. Bait 30 is then withdrawn at a controlled rate, additional molten glass being continuously supplied through orifice 8. The temperature regulating sequence and length of mold 14 are such that when bait 30 is finally withdrawn from orifice 34 having a glass article 35 attached thereto, the glass article 35 will be at such a temperature that it has structural rigidity.

Means not shown is provided for continuously withdrawing bait 30 and article 35 from orifice 34. Accordingly, as long as glass is supplied to orifice 8, an article 35 of infinite length can be produced.

Under some operating conditions, when glass article 35 leaves the tip 19 of mandrel 10, there may be some tendency for atmospheric pressure to crush the resulting article. Accordingly, it is within the realm of this invention to bleed the tip 19 of the mandrel to the atmohpere or, if necessary, to provide positive air pressure via an appropriate orifice.

The apparatus and method of this invention are adapted to utilize a wide range of glass compositions. Examples of suitable glasses which can be utilized in accordance with this invention are: lead silicate glasses, alumino silicate glasses, alkali titania silicate glasses, lead borosilicate glasses, zinc borate glasses, lead-lime-barium glasses, rare earth glasses, borosilicate glasses, magnesium aluminosilicate low expansion ceramics and lithium aluminosilicate low expansion ceramics.

It is obvious to one skilled in the art that relative dimensions and proportions can be varied without departing from the scope of this invention. Likewise, while the apparatus and method as described above are directed primarily to continuously casting glass tubing, the invention at hand can be utilized to form any shaped member, for example, a hollow, rectangular member, from any suitable thermoplastic material.

Various modifications may be resorted to within the spirit and scope of the appended claims.

What is claimed is:

1. Apparatus for casting molten glass into a structurally rigid tubular form comprising in combination: an elongate hollow mold member having an inner molding surface, said mold member being angularly inclined with respect to the horizon and being open at its lower end for egress of a cast tube therefrom; a mandrel having a lowermost portion thereof disposed within the hollow mold member, said lowermost portion of the mandrel having an outer molding surface which is substantially concentrically spaced from, and which is totally surrounded by an upper portion of the inner molding surface of the hollow mold member, the lower portion of the hollow member extending substantially beyond the lowermost end of the mandrel, said outer molding surface of the mandrel thereby defining an annular space of substantial length with said upper portion of the inner molding surface of the hollow mold member; means for directing a stream of molten glass toward an elevated location of the mandrel to flow along the mandrel toward the lowermost extremity thereof, and to substantially fill, and conform in shape to, said annular space; and cooling means extending along said hollow mold member from a location radially aligned with a region well upstream of the lowermost portion of the annular space to a location radially aligned with a region substantially downstream of the lowermost portion of the mandrel for cooling said glass stream within said hollow mold member as it passes from said higher region to said lower region, said tube being cooled to its structurally rigid final state as it reaches said lower region.

2. Apparatus according to claim 1 wherein the outer molding surface of the mandrel tapers inwardly in the direction of glass movement through the annular space, wherein the inner molding surface of the mold tapers outwardly in said direction of glass movement, and further comprising means for circulation of a coolant through said mandrel to augment the cooling of said glass stream by said cooling means.

3. Apparatus according to claim 1 wherein said means for delivering the molten glass stream to the mandrel comprises a closed delivery tube which extends into said hollow, elongate mold member.

4. Apparatus according to claim 1 and further comprising means for rotating at least one member of the group consisting of the mandrel and the mold member about the longitudinal central axis of such member.

References Cited

UNITED STATES PATENTS

| 1,218,598 | 3/1917 | Danner | 65—89 |
| 1,642,312 | 9/1927 | Schoonenberg | 65—184 |
| 2,972,837 | 2/1961 | Pinutti | 65—184 XR |

FOREIGN PATENTS

| 901,337 | 10/1944 | France. |
| 1,198,019 | 8/1965 | Germany. |

FRANK W. MIGA, Primary Examiner

U.S. Cl. X.R.

65—89, 302